United States Patent [19]

Swavely

[11] 4,199,859
[45] Apr. 29, 1980

[54] LOCKING DEVICE FOR CIRCUMFERENTIALLY ORIENTED ELEMENTS

[75] Inventor: Donald F. Swavely, Reading, Pa.

[73] Assignee: The Polymer Corporation, Reading, Pa.

[21] Appl. No.: 949,770

[22] Filed: Oct. 10, 1978

[51] Int. Cl.² .................. B23P 19/00; F16C 33/08
[52] U.S. Cl. ............................ 29/526 R; 308/238; 308/DIG. 7; 403/377
[58] Field of Search ............ 29/526 R; 285/305, 276; 308/8.2, 18, 238, DIG. 7, DIG. 11; 403/361, 375, 376, 377, 405

[56] References Cited

U.S. PATENT DOCUMENTS

| 1,905,079 | 4/1933 | Wellensiek et al. ............. 308/8.2 |
| 1,916,989 | 7/1933 | Rader ........................... 285/305 X |
| 2,336,974 | 12/1943 | Abegg .......................... 285/305 X |
| 3,135,564 | 6/1964 | Agens ......................... 308/DIG. 7 |

Primary Examiner—Frederick R. Schmidt
Attorney, Agent, or Firm—Richard O. Church

[57] ABSTRACT

A method for mounting one element in surrounding relationship to another element is disclosed in which a groove is provided on the OD of the inner element and a complementary groove is provided on the ID of the outer element so that when the parts are assembled, a channel is defined into which a locking device may be inserted to prevent relative lateral movement between the inner and outer elements.

3 Claims, 5 Drawing Figures

LOCKING DEVICE FOR CIRCUMFERENTIALLY ORIENTED ELEMENTS

BACKGROUND OF THE INVENTION

1. Field of the Invention

This invention relates to methods and means for mounting one element in circumferential relationship with another element in which either or both elements are non-metallic and in which lateral movement of the assembled elements relative to each other is prevented.

2. Description of the Prior Art

It is conventional to assemble one element in surrounding relationship to another element as, for example, when attaching a flange to a cylinder or a wheel to a bushing, by means of a pressed fit. This method is comparatively inexpensive and works well when both the inner and outer elements are metallic. When the interference fit is properly selected, a bushing or other type metallic bearing can be pressed within the hub of a wheel, pulley or sheave and the interference fit will suffice to prevent the bushing from moving axially with respect to the hub when mounted on a shaft for rotation. However, when either the bearing or the hub are made from a non-metallic material such as a plastic, a pressed fit is not always adequate to secure the one element to the other. If one element is plastic and the other is metal this is due, in part, to the lower modulus of plastics as compared to metal as well as the large difference in the coefficient of thermal expansion between plastics and metals which, under varying temperature conditions, may cause the interference fit to loosen. An interference fit may also loosen in time when one or both of the elements is made from plastic since most plastics are subject to cold flow and creep.

Plates mounted on either side of the assemblage may be secured by threaded bolts to prevent the two elements from moving laterally with respect to each other but this may be objectionable due to the increased size, weight, and cost of the assemblage.

Accordingly, it is an object of this invention to provide methods and means whereby one element may be mounted in surrounding relationship to another element in a manner in which the elements are prevented from moving laterally with respect to each other.

Another object of this invention is to provide methods and means whereby the lateral movement between an outer element mounted in surrounding relationship to an inner part may be prevented under conditions of use, particularly when one of the elements is made of plastic, but which permits the parts to be non-destructively separated if desired.

Briefly these and other objects of this invention are achieved by providing complementary grooves on the OD of the inner element and the ID of the outer element to define, when the elements are assembled, an annular channel into which a locking member can be inserted. In one embodiment of this invention, a radial passage is drilled through one element to provide access to the channel and, after assembly, round balls having a diameter slightly smaller than the diameter of the channel are fed into the channel. After the balls have been inserted, the drilled passageway is capped to prevent the balls from coming out. Depending upon the number of balls used and their modulus, the resistance to lateral movement of the one element relative to the other element can be controlled so that, if desired, the resistance to lateral movement may be sufficient to restrain motion during intended conditions of use, but may yield to permit nondestructive separation of the two elements when a sufficient force is provided.

This invention finds particular utility for mounting a rim or a flange on a cylindrical body or when inserting a bushing into a device such as a wheel, gear or pulley in preparation for mounting the device on a shaft for rotation.

A better understanding of this invention can be obtained by reference to the accompanying drawings in which.

Figure 1:
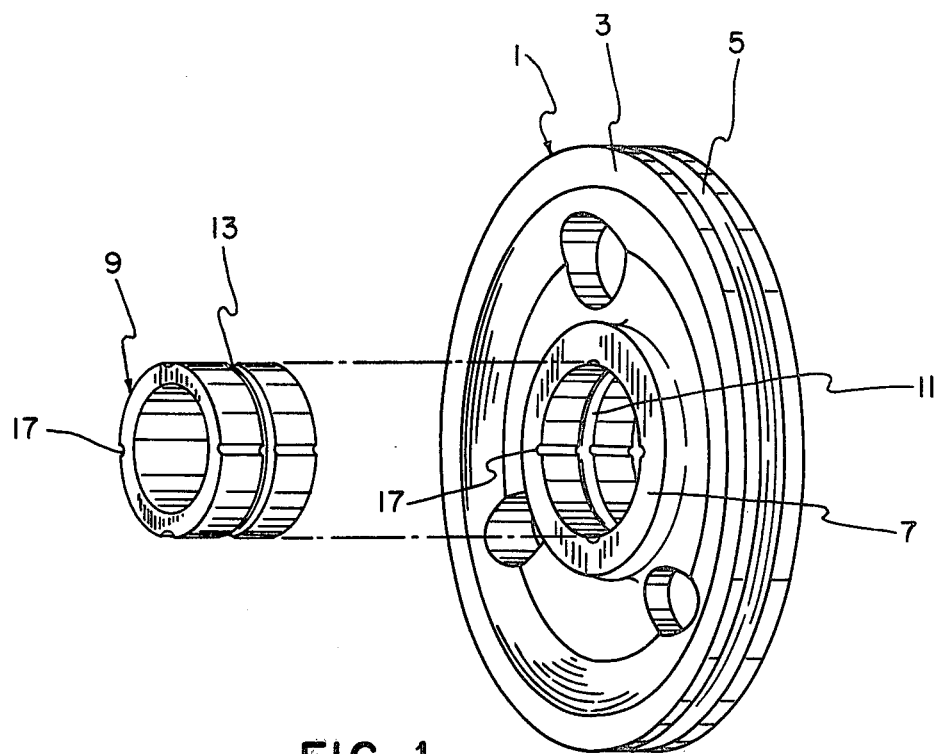
FIG. 1 is an exploded perspective view of a bushing positioned for mounting on a sheave in accordance with this invention.
Figure 2:
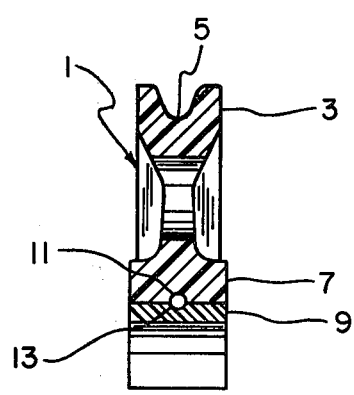
FIG. 2 is a sectional view of a quadrant of the assembled elements of FIG. 1.

With reference with FIGS. 1 and 2 there is shown a sheave 1 having a rim 3, a rope groove 5 and a hub 7. In order to form a bearing surface for mounting the sheave 1 on a shaft (not shown) for rotation, a bushing 9 is pressed fit into the hub 7 of the sheave 1.

In FIG. 2 it can be seen that a half-round groove 11 is machined into the ID of the hub 7 of the sheave 1 and a complementary half-round groove 13 is machined into the OD of the bushing 9. When the bushing is pressed into the hub 7, the two half-round grooves 11 and 13 align to form an annular passageway into which a locking device (not shown) may be inserted.

Figure 3:
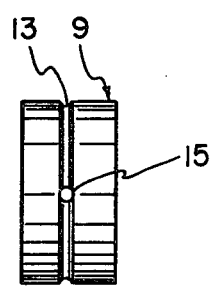
FIG. 3 is a side view of the bushing of FIG. 1.
Figure 4:
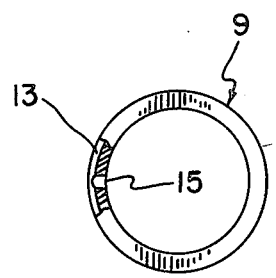
FIG. 4 is a side view, partially broken away, of the bushing of FIG. 3.

In FIGS. 3 and 4 the bushing is illustrated in greater detail and it can be seen that a drilled radial passage 15 communicates from the ID of the bushing 9 to the half-round groove 13. In this modification of the invention, after the bushing 9 has been fit into the hub 7, spherical balls having a diameter slightly less than the diameter of annular passageway defined by grooves 11 and 13, can be dropped through the drilled passage 15 to fill the annular passageway. After the balls have been inserted, the drilled passage 15 is plugged to prevent the balls from falling out. To prevent rotation of the hub 7 relative to the bushing 9, splines (not shown) may be inserted into axially drilled holes 17 intermediate the hub 7 and the bushing 9.

In another modification of this invention, the drilled passage 15 may be drilled somewhat tangentially to the groove 13 so that instead of utilizing balls, a flexible small diameter rod may be used to fill the annular passage defined by grooves 11 and 13 to serve as the locking mechanism.

In still another variation of this invention, the annular passage defined by the grooves 11 and 13 may be filled with a liquid material that is capable of solidifying after it is inserted in the passageway. A curable or polymerizable material such as an epoxy or a urethane may be used for this purpose.

In a preferred embodiment of this invention, the sheave 1 may be made of a hard wear resistant plastic such as nylon along with a plastic bushing having a lower coefficient of friction such as an internally lubricated nylon. In this instance, if spherical balls are used to fill the defined passageway, it is convenient to make them from nylon or other material having some degree of compressability. When this is done, while the balls will serve to prevent lateral movement of the sheave relative to the bushing, they will have sufficient resiliency so that, when desired, the bushing can be forced out of the hub 7 of the sheave 1. By this means, if the bushing becomes unduly worn while the sheave is still in good condition, the old bushing may be pressed out of the hub 7 and a new bushing pressed into the hub and re-assembled by the method of this invention.

Figure 5:
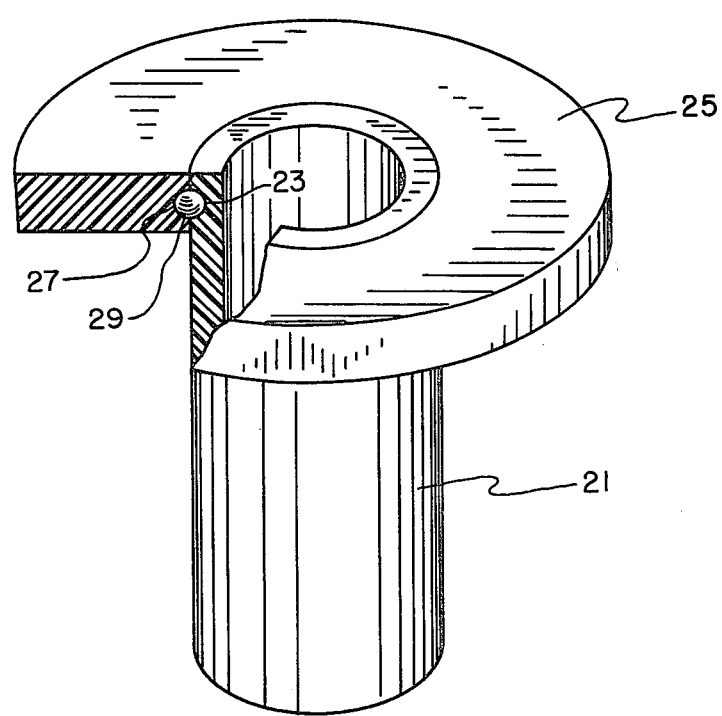
FIG. 5 illustrates a method of attaching a flange to a pipe in accordance with the method of this invention.

FIG. 5 illustrates the utility of this invention in axially positioning a flange on a hollow cylinder or conduit. Here the pipe 21 is provided with a half-round groove 23 and a flange 25 is mounted in surrounding relationship to the pipe 21 having a complementary groove 27. The mating grooves 23 and 25 form a annular passageway in which a locking device 29 such as disclosed above, can be inserted.

I claim:

1. A method for assembling a plastic low friction bushing within a plastic rotatable machine element such as a gear, wheel or sheave for mounting the assemblage on a shaft for rotation which comprises:

forming a circumferential half round groove in the interior diameter of the machine element;

forming a half round circumferential groove in the outside diameter of the bushing;

drilling a radial passageway in the bushing to communicate from its inside diameter to its circumferential groove;

positioning the bushing within the element and aligning the respective circumferential half round grooves to form a closed annular channel;

filling the channel with a plurality of resilient plastic spheres by introducing them through the radial passageway of the bushing;

capping the radial passageway to prevent the escape of the resilient spheres; and axially pinning the machine element to the bushing to prevent rotation of the machine element relative to the bushing, whereby the machine element and the bushing may be nondestructively separated.

2. A method according to claim 1 wherein the resilient plastic spheres are made of nylon.

3. A method according to claim 1 wherein the machine element and the bushing are made of nylon.

* * * * *